United States Patent [19]

Harrison

[11] Patent Number: 4,568,091

[45] Date of Patent: Feb. 4, 1986

[54] LEAK REPAIR CLAMP WITH FLEXIBLE LIP SEALS

[75] Inventor: George W. Harrison, Houston, Tex.

[73] Assignee: Team, Inc., Alvin, Tex.

[21] Appl. No.: 718,363

[22] Filed: Mar. 25, 1985

Related U.S. Application Data

[63] Continuation of Ser. No. 502,185, Jun. 7, 1983, abandoned.

[51] Int. Cl.[4] .................. F16J 15/10; F16J 15/46; F16L 55/16

[52] U.S. Cl. .................. 277/101; 277/197; 277/205; 277/226; 285/15; 285/373

[58] Field of Search .............. 277/101, 192, 197, 205, 277/206 R, 206 A, 207 R, 207 A, 207 B, 211, 212 R, 212 C, 226; 285/111, 112, 15, 373

[56] References Cited

U.S. PATENT DOCUMENTS

| | | | |
|---|---|---|---|
| 1,618,412 | 2/1927 | Dorward | 277/205 X |
| 2,387,182 | 10/1945 | Procter | 277/205 X |
| 2,884,291 | 4/1959 | Whitten | 277/205 |
| 3,189,359 | 6/1965 | Haberkorn | 277/205 |
| 3,189,360 | 6/1965 | Haberkorn | 277/205 |
| 3,419,290 | 12/1968 | Campbell et al. | 277/101 X |
| 3,603,616 | 9/1971 | Smith | 285/15 |
| 4,049,296 | 9/1977 | Harrison | 285/15 |
| 4,342,460 | 8/1982 | Eng | 277/205 X |

FOREIGN PATENT DOCUMENTS

| | | | |
|---|---|---|---|
| 2012240 | 10/1971 | Fed. Rep. of Germany | 277/206 R |
| 944921 | 12/1963 | United Kingdom | 277/205 |
| 974091 | 11/1964 | United Kingdom | 277/197 |
| 1019523 | 2/1966 | United Kingdom | 277/205 |

Primary Examiner—Robert S. Ward
Attorney, Agent, or Firm—Guy E. Matthews

[57] ABSTRACT

A sealing member including a seal retainer sleeve provided in segments and two spaced apart grooves defined all around the inner wall of the sleeve. Sleeve is adapted to be fitted around outside of a cylindrical surface on each side of an opening. An elastomeric fluid pressure seal segment is mounted within each groove in the sleeve to provide a fluid tight seal within the spaced confined between the grooves. The bottom of each of the grooves is dovetailed to retain corresponding mounting beads of the seal. Each segment of the seal, as mounted within the grooves, is shaped with an outside diameter surface merging into the mounting beads. The high pressure bead of the mounting beads merges into the side of a groove extending axially into the segment. The other side of the groove merges into a flexible lip which is responsive to pressure applied within the cylindrical space. The lip extends into an inside diameter surface. The inside diameter surface merges into an annular low pressure surface which merges into the low pressure bead of the mounting beads. Fastener means are adapted to fasten the segments into the integrated retainer sleeve with the seal segments being radially compressed between said retainer sleeve and the cylindrical surface and circumferentially compressed within the grooves. Seal member may further include a sealant forced into the cylindrical space under pressure via an inlet.

6 Claims, 4 Drawing Figures

LEAK REPAIR CLAMP WITH FLEXIBLE LIP SEALS

This is a continuation of application Ser. No. 502,185, filed June 7, 1983, now abandoned.

BACKGROUND OF THE INVENTION

This invention relates generally to sealing apparatus and more specifically relates to a combination seal member for forming an occlusive, self-energizing seal between two opposing surfaces.

Many forms of resilient, deformable sealing members, or seals, are known for occlusively sealing between two opposing surfaces. Of these, seals which have increased sealing capacity when confronted by fluid pressure between the two surfaces are known as self-energizing seals. Many self-energizing seals presently in use are difficult to secure in position against one of the surfaces to be sealed between, typically requiring at least an independent flange or mounting piece to keep the seal in place. When the triangular seal is installed between the two opposing surfaces, the seal is deformed and assumes a generally "V"-shaped profile, with the trough of the "V" facing the expected fluid pressure, such that the pressure enters the trough of the "V", exerting force upon the upper, or nonretained, surface of the seal, forcing it against the adjacent surface, while applying minimal, if any, force to urge the retained end of the seal into greater compliance with its adjacent surface.

Accordingly, the present invention overcomes the deficiencies of the prior art by providing a self-energizing seal which may be installed and retained in a surface without the necessity of independent mounting pieces and which is responsive to pressure so as to yield optimal sealing with both contact surfaces.

SUMMARY OF THE INVENTION

The present invention provides a sealing member combination including a seal retainer sleeve provided in at least two sleeve segments. Two spaced apart grooves are defined in the inner wall of the sleeve and all around the inner wall of the sleeve. An elastomeric fluid pressure seal segment is mounted within each groove in each sleeve segment of the retainer sleeve. The seals formed by these segments are adapted to provide a fluid tight seal between the cylindrical space confined between said grooves and the outside of the grooves as mounted around the flanges of a pipe connection, for example. The bottom of each of the grooves is dovetailed to retain corresponding mounting beads formed on each seal segment. Each seal segment is formed, as mounted within the grooves with an outside diameter surface merging into the mounting beads. The high pressure bead of the mounting beads merges into the inside of a groove extending axially into the segment. The other side of the groove merges into a flexible lip which is responsive to pressure applied within the cylindrical space. The lip extends into an inside diameter surface. The inside diameter surface merges into an annular low pressure surface with the low pressure surface merging into the low pressure bead of the mounting beads. A fastener means is adapted to fasten the sleeve to form the integrated retainer sleeve with the seal segments being radially compressed between the retainer sleeve and the cylindrical surface, and circumferentially compressed within the grooves. The seal member can further include a sealant forced into the cylindrical space under pressure via an inlet provided through the wall of the retainer sleeve between the grooves.

DETAILED DESCRIPTION OF A PREFERRED EMBODIMENT

Figure 1:
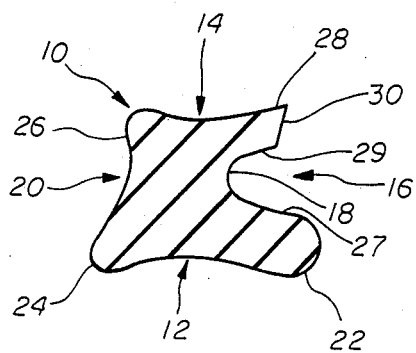
FIG. 1 is a lateral cross-sectional view of a seal in accordance with the present invention.
Figure 2:
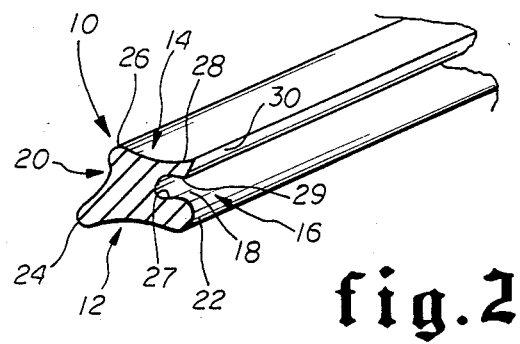
FIG. 2 is a perspective view of the seal of FIG. 1.

Referring now to the drawings in more detail, particularly to FIGS. 1 and 2, therein is shown in FIG. 1, a seal 10 in accordance with the present invention illustrated in lateral cross-section and in FIG. 2, a perspective view of seal 10 of FIG. 1. Viewed in lateral cross-section as in FIG. 1, seal 10 exhibits a roughly trapezoidal cross-section, having a first or "major" surface 12 and a generally parallel second or "minor" surface 14 which is preferably of lesser length than major surface 12. Seal also has a forward surface 16 containing a notch or groove 18 therein and a rearward surface 20. The joining of a major surface 12 with forward surface 16 is bulbously rounded, forming a bead 22 at such intersection of surfaces. A similar bead 24 is formed at the joining of major surface 12 and rearward surface 20. Beads 22 and 24 are cooperatively conformed, such that, viewed in profile, major surface 12 assumes a generally curvilinear form wherein the central portion of major surface 12 is slightly indented relative to the outer surfaces of beads 22 and 24. A similar but smaller bead 26 is formed at the joining of a minor surface 14 and rearward surface 20. At the opposite or forward end of a minor surface 14, a lip 28 is formed, inclining slightly upwards from the central portion of minor surface 14, the lower surface of lip 28 being defined by upper wall 29 of groove 18 in forward surface 16. Groove 18 is preferably located on forward surface 16 such that the dimension from lower wall 27 of groove 30 to major surface 12 is greater than the dimension from upper surface 29 of groove 18 to minor surface 14, thereby giving lip 28 increased pliability relative to the remaining portion of seal 10 surrounding groove 18 and making lip 28 movingly responsive to pressure within groove 18. Leading edge 30 of lip 28 preferably meets minor surface 14 at an angle proximate but less than 90 degrees.

Figure 3:
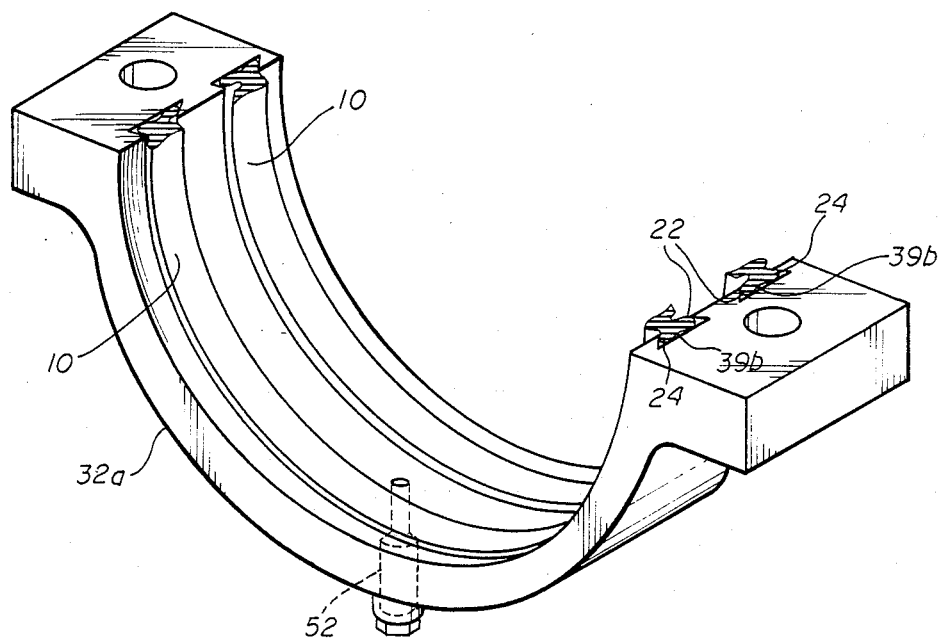
FIG. 3 is a perspective view of one of two portions of a leak repair clamp with a pair of seals in accordance with the present invention installed thereon.

Referring now to FIG. 3 of the drawings, therein is shown, in perspective view, two lengths of seal 10 installed in and retained by one of two sections 32a of one embodiment of a leak repair clamp 38 which is generally of a type described and illustrated in my U.S. Pat. No. 4,049,296, issued Sept. 20, 1977. It will be seen that beads 22 and 24 at extremities of major surface 12 facilitate the retention of seals 10 within dovetail grooves 39a, 39b in clamp section 32a without the necessity of additional securing devices.

Figure 4:
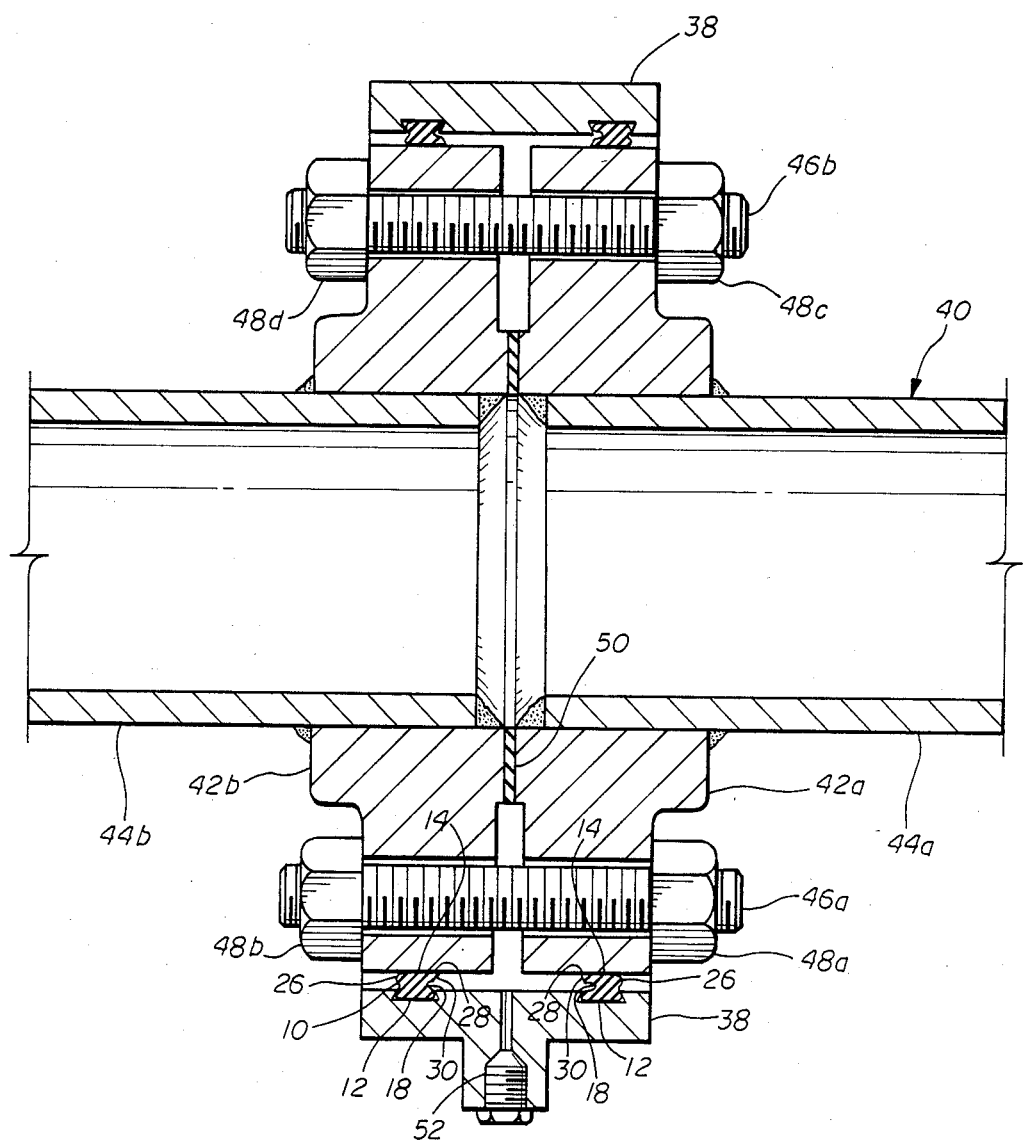
FIG. 4 is a view, partially in cross-section, of a conventional pipe coupling and a leak repair clamp as partially illustrated in FIG. 3 including a plurality of seals in one intended application of the present invention.

Referring now to FIG. 4, therein is illustrated, partially in longitudinal cross-section, a pair of leak repair clamp sections 32a, 32b as shown in FIG. 3, installed on a pipe line 40 disposed about adjacent abutting pipe flanges 42a, 42b in an intended usage for sealing a leak through the pipe flange connection. Flanges 42a, 42b of pipe sections 44a, 44b are secured together by a plurality of flange bolts 46a, 46b, and cooperatively engaging flange bolt nuts 48a, 48b, 48c, 48d which draw flanges 42a, 42b together and compress flange gasket 50 located therebetween to seal the pipe sections together in a manner known to be art. A leak repair clamp 38 may be used to seal a leak through flange gasket 50 when clamp sections 38 are in the position shown in FIG. 4. As clamp sections 32a, 32b are bolted and tightened together around pipe flanges 42a and 42b, appropriately sized seals 10 will contact the outer radial peripheries of each flange 42a, 42b and will be placed into compression thereagainst. As this compression occurs, beads 22 and 24 on major surface 12 of each seal 10 are compressed, thereby expanding the nominal length of major surface 12, improving the sealing engagement of seal 10 with clamp sections 32a, 32b generally, and specifically improving the sealing engagement of seal 10 with dovetail grooves 39a, 39b therein, particularly at the forward and leading edges thereof, thus minimizing the likelihood of fluid leakage thereby. Simultaneously, as minor surface 14 contacts pipe flanges 42a, 42b, lip 28 and bead 26 are compressed thereagainst. It will be appreciated that while bead 26 on minor surface 14 will compress and generally seal against pipe flange 42a or 42b, lip 26 which is more pliable, due to the presence of groove 18 therebeneath, as discussed earlier herein, will compress to very close conformity against the surface of pipe flange 42a or 42b, including conformity against pits or anomalies therein. Further, fluid pressure, either in a form resulting from the leak itself or in the form of a sealant which may be pumped into clamp 38 through inlet orifice 52 in a typical sealing operation, will enter groove 18 and act upon relatively pliable lip 28 of seal 10, urging it into even greater compliance with flange 42a or 42b, thus yielding optimal sealing against the peripheral surfaces of pipe flanges 42a or 42b, despite anomalies therein. The distinct angle of leading edge 30 of lip 28 of seal 10 serves to further enhance the sealing effect by presenting an abutting surface to oncoming fluid pressure, so as to direct the fluid away from the contact surface and toward groove 18, thereby encouraging the further enhancement of the sealing engagement of lip 28 and pipe flange 42a or 42b.

Many modifications and variations besides those specifically mentioned may be made in the techniques and structures discussed herein and illustrated in the accompanying drawings, both in terms of the invention and applications thereof, without departing substantially from the concept of the present invention. In particular, it will be apparent to one skilled in the art that the usage of the seal of this invention is not limited to use within a leak repair clamp but may be in any one of a variety of applications requiring an occlusive seal between opposing surfaces.

The embodiments of the invention in which an exclusive property or privilege is claimed are defined as follows:

1. A sealing member in combination comprising:
   (a) a seal retainer sleeve provided in at least two sleeve segments;
   (b) two spaced apart grooves defined in the inner wall of said sleeve and all around the inner wall of said sleeve;
   (c) said sleeve being adapted to be fitted around the outside of a cylindrical surface with said grooves being axially disposed on each side of an opening through said cylindrical surface;
   (d) an elastomeric fluid pressure seal segment mounted within each groove in each said sleeve segment of said retainer sleeve and adapted to provide a fluid tight seal between the cylindrical space confined between said grooves and the outside of said grooves;
   (e) the bottom of each of said grooves being dovetailed to retain corresponding mounting beads defined by said seal segment;
   (f) each said seal segment defining, as mounted within said grooves, (1) an outside diameter surface merging into said mounting beads, (2) the high pressure bead of said mounting beads extending toward said cylindrical space merging into the side of a groove extending axially into said segment, (3) another side of said groove merging into a flexible lip which is responsive to pressure applied within said cylindrical space, (4) said lip extending into an inside diameter surface, (5) said inside diameter surface merging into the annular low pressure surface, and (6) with the low pressure surface merging into the low pressure bead of said mounting beads; and
   (g) fastener means adapted to fasten said segments into the integrated retainer sleeve with the seal segments being (1) radially compressed between said retainer sleeve and said cylindrical surface, and (2) circumferentially compressed within said grooves to effect sealing abutment between contiguous seal segments.

2. The seal member of claim 1 further including a sealant forced into said cylindrical space under pressure via an inlet defined through the wall of said retainer sleeve between said grooves.

3. The sealing member of claim 1 wherein said fastener means comprise flange means provided at each end of each of said sleeve segments, said flange means being pulled together by threaded fastners to form said retainer sleeve.

4. The sealing member of claim 1 wherein said fastener means comprise threaded connectors.

5. The seal member of claim 1 wherein said cylindrical surface is defined by the exterior surfaces of a flanged pipe connection member.

6. The sealing member of claim 1 wherein said elastomeric seal segment is comprised of polyethylene.

* * * * *